(12) United States Patent
Raslain et al.

(10) Patent No.: US 12,006,877 B2
(45) Date of Patent: Jun. 11, 2024

(54) METHOD AND SYSTEM FOR CONTROLLING A TURBOMACHINE WITH CONTROL SATURATIONS MANAGEMENT

(71) Applicant: SAFRAN AIRCRAFT ENGINES, Paris (FR)

(72) Inventors: Typhaine Raslain, Moissy-Cramayel (FR); Christophe Marc Alexandre Le Brun, Moissy-Cramayel (FR); Sylvain Clermonte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 317 days.

(21) Appl. No.: 17/593,642

(22) PCT Filed: Mar. 18, 2020

(86) PCT No.: PCT/FR2020/050587
§ 371 (c)(1),
(2) Date: Sep. 22, 2021

(87) PCT Pub. No.: WO2020/193919
PCT Pub. Date: Oct. 1, 2020

(65) Prior Publication Data
US 2022/0010737 A1 Jan. 13, 2022

(30) Foreign Application Priority Data
Mar. 26, 2019 (FR) ...................................... 1903141

(51) Int. Cl.
*F02C 9/00* (2006.01)
(52) U.S. Cl.
CPC .......... *F02C 9/00* (2013.01); *F05D 2220/323* (2013.01); *F05D 2270/336* (2013.01)

(58) Field of Classification Search
CPC . F02C 9/00; F05D 2220/323; F05D 2273/336
(Continued)

(56) References Cited

U.S. PATENT DOCUMENTS

| 4,772,180 A | * | 9/1988 | Walker | ................. | B64C 11/306 |
| | | | | | 416/27 |
| 10,094,569 B2 | * | 10/2018 | Davis, Jr. | ................. | F02C 9/28 |

(Continued)

FOREIGN PATENT DOCUMENTS

| EP | 2623711 A2 | 8/2013 |
| FR | 3055029 A1 | 2/2018 |

OTHER PUBLICATIONS

International Search Report issued in International Application No. PCT/FR2020/050587 on Sep. 3, 2020 (2 pages).
(Continued)

*Primary Examiner* — Yazan A Soofi
(74) *Attorney, Agent, or Firm* — Bookoff McAndrews, PLLC (57) ABSTRACT

Method for controlling a first, a second and a third variable of a turbomachine as a function of a first, a second and a third control quantity of a turbomachine which can each be saturated as a function of the operating parameters of the turbomachine.

The method comprises a first multivariable correction (120) delivering a first value for the three control quantities, a selection (130) of the first control quantity to be delivered as a function of a minimum value, of a maximum value and of the value determined by the first correction, a second multivariable correction (140) delivering a second value for the second and third control quantities, and a selection (150) of the values of the second and third control quantities to be delivered in the values determined during the first correction and those determined during the second correction.

8 Claims, 4 Drawing Sheets

(58) Field of Classification Search
USPC ........................................................ 701/100
See application file for complete search history.

(56) References Cited

U.S. PATENT DOCUMENTS

| | | | |
|---|---|---|---|
| 10,094,571 B2* | 10/2018 | Davis, Jr. .................. | F02C 9/28 |
| 2007/0162161 A1* | 7/2007 | Kumar .................. | G05B 11/32 |
| | | | 700/29 |
| 2013/0021150 A1 | 8/2013 | Lu et al. | |
| 2013/0211550 A1* | 8/2013 | Lu .......................... | G05B 11/32 |
| | | | 700/19 |
| 2019/0165708 A1* | 5/2019 | Smith ....................... | F02C 9/32 |

OTHER PUBLICATIONS

Search Report issued in French Application FR 1903141 on Dec. 4, 2019 (2 pages).

* cited by examiner

METHOD AND SYSTEM FOR CONTROLLING A TURBOMACHINE WITH CONTROL SATURATIONS MANAGEMENT

CROSS-REFERENCE TO RELATED APPLICATION(S)

This patent application is the U.S. National Stage entry under 35 U.S.C. § 371 of International Patent Application No. PCT/FR2020/050587, filed on Mar. 18, 2020, which claims the benefit of priority to French Patent Application No. 1903141, filed on Mar. 26, 2019.

TECHNICAL FIELD

The invention relates to the field of the systems for controlling turbomachines, in particular turboprop engines or turbomachines with unducted fan also known as Unducted Single Fan or USF.

PRIOR ART

Figure 1:
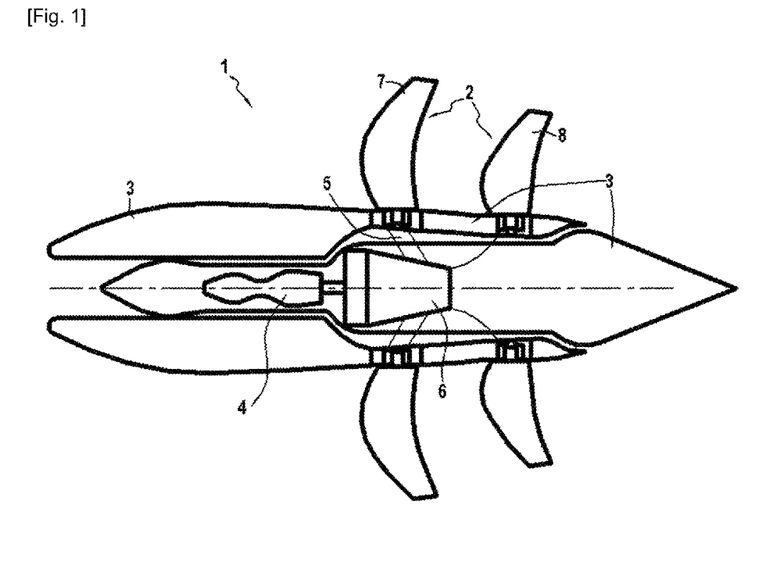
FIG. 1, already described, represents a turbomachine with unducted fan according to the state of the art.

FIG. 1 represents a turbomachine with unducted fan according to the state of the art, or unducted fan. As illustrated in FIG. 1, an unducted fan 1, also called open rotor, is an aircraft turbojet engine whose fan 2 is directly fixed to the power turbine and outside a nacelle 3, which allows increasing the bypass ratio of the engine compared to a ducted turbojet engine, and thus reducing fuel consumption.

An open rotor is generally equipped with a gas generator 4 and with a free turbine 5 driving, via a reduction gearbox 6, two contra-rotating variable-pitch propellers 7 and 8.

Figure 2:
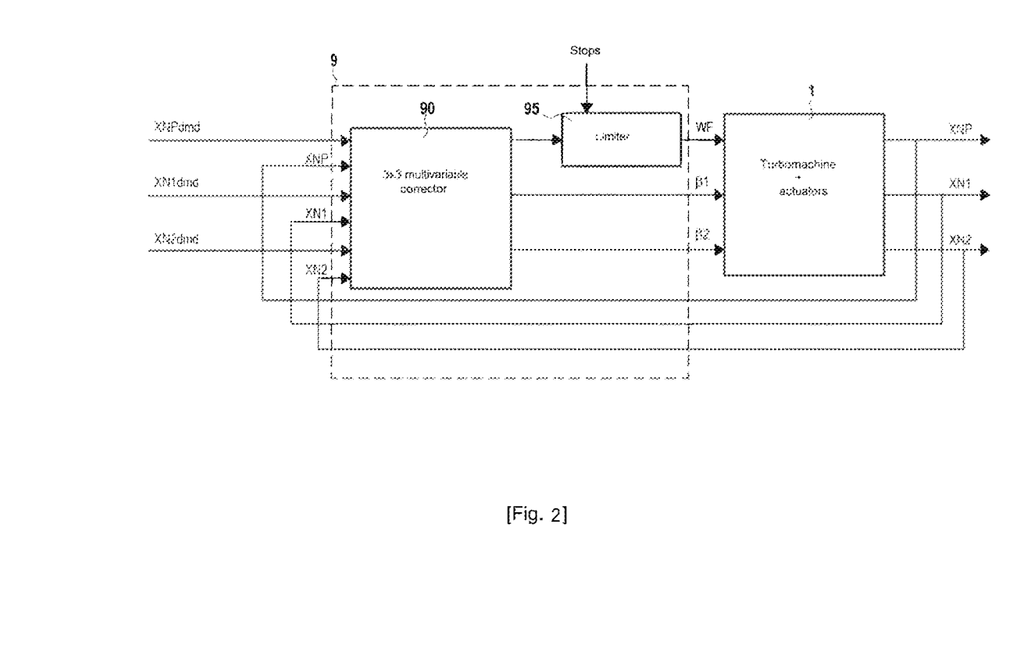
FIG. 2, already described, schematically represents a control system according to the state of the art for the unducted fan of FIG. 1.

As illustrated in FIG. 2 which schematically represents a system for controlling an open rotor 1, an open rotor 1 can be considered from a command point of view as a multivariable system comprising three control quantities and three output quantities which must be regulated. The three control quantities of the open rotor 1 are the fuel flow rate, denoted WF, the upstream propeller pitch, also called upstream setting angle and denoted $\beta_1$, and the downstream propeller pitch, also called downstream setting angle and denoted $\beta_2$. The three output quantities of the open rotor 1 are the speed of rotation of the low-pressure compressor, denoted XNP, the speed of rotation of the upstream propeller, denoted XN1, and the speed of rotation of the downstream propeller, denoted XN2. The speed of rotation of the upstream propeller and that of the downstream propeller XN1 and XN2 are servo-controlled around several speed steps defined by the operating conditions.

Such a system includes significant couplings between the different control and output quantities.

As illustrated in FIG. 2, the control system 9 generally comprises a multivariable regulator 90 with three inputs and three outputs, also denoted 3×3 multivariable regulator, which intrinsically takes into account the couplings between the different control and output quantities. The multivariable regulator 90 allows ensuring satisfactory decoupling in most cases, in order to be able to vary the output quantities XNP, XN1 and XN2 of the open rotor 1 independently of each other.

The multivariable regulator 90 receives as input the values of the three output quantities XNP, XN1 and XN2 of the open rotor 1 as well as three corresponding output quantity setpoints $XNP_{dmd}$, $XN1_{dmd}$ and $XN2_{dmd}$.

However, to comply with the operational constraints of the turbomachine, the calculated fuel flow rate command WF may be saturated or not taken into account in some cases. There are indeed minimum and maximum stops calculated in real time to protect the motor from the pumping during the transient phases. This saturation can be achieved by a limiter 95 independently of the other commands.

Likewise, the upstream and downstream setting angles can also be saturated using other limiters independently of the fuel flow rate command. As each limiter acts on one command independently of the other command, the applied commands are no longer consistent relative to each other.

In addition, different protection loops against over-speeds, over-temperatures, over-pressures, etc. are also put into competition at the level of the development of the setpoint of the fuel flow rate.

These cases pose problems for the decoupling. Indeed, the commands coming from the 3×3 multivariable corrector are calculated so as to be consistent with each other in order to counteract the interactions and ensure the decoupling of the outputs.

If the value of a command is changed, the decoupling is no longer ensured, which generally results in exceedances on the regulated outputs.

For example, for the sake of simplification, if a 2×2 multivariable regulator, that is to say with 2 control inputs and two output variables to be regulated, is assumed, if the second control input is not modified when the first input is saturated, the direction of the resulting control vector formed from the two initial control vectors, each corresponding to one of the control inputs, is directly affected and erroneous.

Solutions have been proposed to overcome the desynchronization of the commands saturated by the limiters. One solution consists in adding additional states, such as the temperature, the pressure or the altitude, in order to take into account the operating constraints when developing the control laws. This first solution is complex to implement.

Another solution consists in recalculating the command not affected by the saturation in order to make it compatible with the saturated command. This second solution is complex to implement and its complexity increases with the number of inputs/outputs.

Document FR 3 055 029 in particular discloses a system for controlling a turboprop engine with a management of the saturations of the command which calculates the admissible maximum servo-control errors to avoid the saturations of the commands. The method implemented by the system relies on reversing the transfer of the corrector which cannot be used on all turbomachines.

The solutions of the prior art for overcoming the desynchronization of the commands saturated by the limiters are therefore not satisfactory.

DISCLOSURE OF THE INVENTION

The invention aims to propose a method and a system for controlling a turbomachine making it possible to synthesize consistent commands and meeting the operating constraints of the turboprop engine in a simple manner.

According to a first aspect of the invention, there is proposed a method for controlling a first, a second and a third variable of a turbomachine as a function of a first, a second and a third control quantity of a turbomachine which can each be saturated as a function of the operating parameters of the turbomachine, the control method comprising:

a measurement of the values of the three variables of the turbomachine, a receipt, for each of said three variables received, of a corresponding setpoint, a first determination in which the first values of the three control quantities of the turbomachine are determined from the values of the three variables and said three corresponding setpoints, a selection of the value of the first control quantity to be delivered to the turbomachine among a maximum value of the first control quantity, a minimum value of the first control quantity and the value of the first control quantity resulting from said first determination, the first selection depending on the operating parameters of the turbomachine, a second determination in which second values of the second and third control quantities of the turbomachine are determined from the values of the three variables, from the second and third corresponding setpoints, and from the value of the first control quantity selected during the first selection, a choice of the pair of values of the second and third control quantities to be delivered to the turbomachine between the pair of the second and third control quantities determined by the first corrector and the pair of the second and third control quantities determined by the second corrector, the choice of the pair of values of the second and third control quantities to be delivered depending on the value of the first selected control quantity to be delivered, and a transmission to the turbomachine of the value of the first control quantity selected and of the values of the second and third control quantities selected.

The control method according to the invention thus allows guaranteeing in a simple and efficient manner the decoupling of the output quantities that is to say of the three variables of the turbomachine, despite the complex management of one of the control quantities such as the fuel flow rate.

In a first aspect of the control method, the method can further comprise an integration of the value of the first control quantity selected and of the values of the second and third control quantities selected before their transmission to the turbomachine.

The integration of the values allows managing smooth transitions between the loops, whether at the level of a first control quantity such as the fuel flow rate or at the level of the second and third control quantities such as setting angles of the blades.

In a second aspect of the control method, the first variable corresponds to the speed of rotation of a low-pressure compressor of the turbomachine, the second variable corresponds to the speed of rotation of an upstream propeller of the turbomachine, and the third variable corresponds to the speed of rotation of a downstream propeller of the turbomachine, the first control quantity corresponds to the fuel flow rate of the turbomachine, the second control quantity corresponds to the pitch of the upstream propeller of the turbomachine and the third control quantity corresponds to the pitch of the downstream propeller of the turbomachine.

In another object of the invention there is proposed a system for controlling a first, a second and a third variable of a turbomachine as a function of a first, a second and a third control quantity of a turbomachine which can each be saturated as a function of the operating parameters of the turbomachine, the control system comprising:

a first corrector with three outputs receiving as input the values of the three variables of the turbomachine as well as, for each of said three variables received, a corresponding setpoint, the three outputs of the first corrector corresponding to the three control quantities of the turbomachine, a first selection unit configured to select, as a function of the operating parameters of the turbomachine, the value of the first control quantity to be delivered to the turbomachine among a maximum value of the first control quantity, a minimum value of the first control quantity and the value of the first control quantity resulting from said first determination, a second corrector with two outputs receiving as input the values of the three variables of the turbomachine as well as the setpoint of the second variable and the setpoint of the third variable and the value of the first control quantity delivered by the first saturation unit, the two outputs of the second corrector corresponding to the second and third control quantities of the turbomachine, and a second selection unit configured to output, based on the selection of the first selection unit, either the pair of second and third control quantities determined by the first corrector, or the pair of second and third control quantities determined by the second corrector, the control system outputting, to control the turbomachine, the value of the first control quantity delivered by the first saturation unit and the values of the second and third control quantities delivered by the second saturation unit.

The proposed solution thus consists in implementing, in addition to the first multivariable corrector with three outputs, a second multivariable corrector to calculate two control quantities such as setting angles which allow maintaining the directionality, by using the information of the first control quantity selected such as the selected fuel flow rate.

The second corrector allows managing two variables via two control quantities, the second and the third ones, as a function of the value of another control quantity, the first one in this case. In other words, in a specific case, the second corrector allows managing the rpm of the propellers by acting on the setting angles, taking into account the information on the fuel flow rate and the rpm of the low-pressure body.

The two correctors run in parallel and a selection logics allows using either of the setting setpoints, based on the selection logics applied to the first control quantity which can be indicated for example via an indicator calculated by the first selection unit.

This architecture can be used for any application requiring a multivariable monitoring with the management of saturation on a control quantity such as the fuel flow rate, particularly the turboprop engines, the turbomachines with unducted fan.

In a first aspect of the control system, the control system may further comprise an integrator receiving as input the value of the first control quantity delivered by the first saturation unit and the values of the second and third control quantities delivered by the second saturation unit, and delivering the processed values of the first, second and third control quantities to the turbomachine.

The common and unique integrator is placed downstream of the first and second selection units. The first and second correctors thus calculate control increments, which can be limited to take into account the different constraints (for example, the C/P stop). The fuel increment value ultimately retained is added to the current fuel command by this integrator.

In another object of the invention, an aircraft is proposed comprising at least one turbomachine and at least one control system as defined above controlling at least one of said at least one turbomachine.

According to one aspect of the aircraft, at least one of said at least one turbomachine controlled by said at least one control system may be a turbomachine with uncured fan.

DESCRIPTION OF THE EMBODIMENTS

Figure 3:
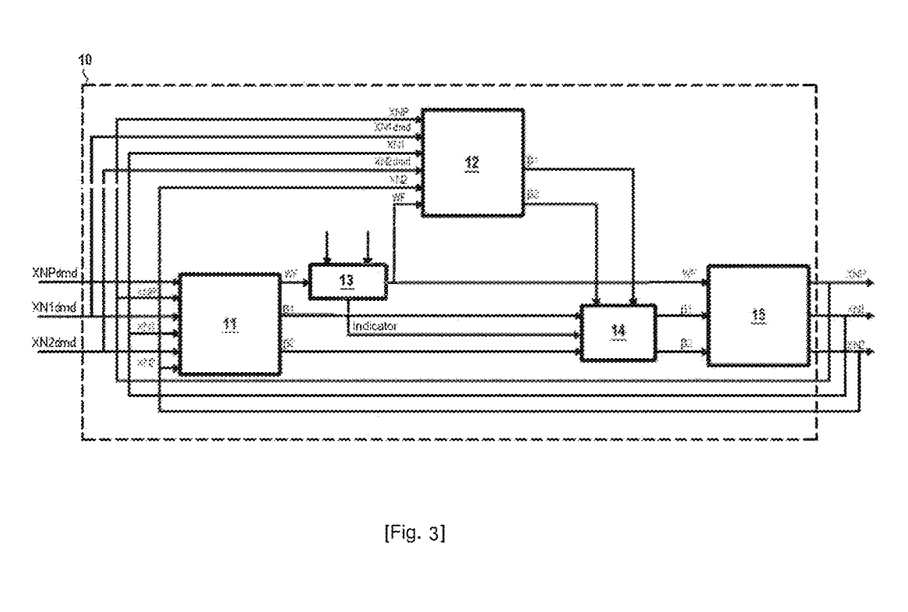
FIG. 3 schematically represents a system for controlling a turbomachine according to one embodiment of the invention.

FIG. 3 is schematically represents a system for controlling 10 a turbomachine according to one embodiment of the invention. The turbomachine controlled by the control system 10 according to the invention may be a turbomachine 1 with unducted fan such as the one described in FIG. 2.

The control system 10 comprises a first corrector 11, a second corrector 12, a first selection unit 13, a second selection unit 14 and an integrator 15.

The first corrector 11 comprises three outputs delivering a first value for each of the three control quantities. The first control quantity corresponds to the fuel flow rate WF of the open rotor 1, the second control quantity corresponds to the pitch $\beta_1$ of the upstream propeller of the open rotor 1 and the third control quantity corresponds to the pitch $\beta_2$ of the downstream propeller of the open rotor 1.

The first corrector 11 receives as input the values of three variables of the open rotor 1, the first variable corresponding to the speed of rotation XNP of a low-pressure compressor of the open rotor 1, the second variable corresponding to the speed of rotation XN1 of an upstream propeller of the open rotor 1, and the third variable corresponding to the speed of rotation XN2 of a downstream propeller of open rotor 1. The first corrector 11 also receives as input a rotation speed setpoint $XNP_{dmd}$ of the low-pressure compressor, a rotation speed setpoint $XN1_{dmd}$ of the upstream propeller, and a rotation speed setpoint $XN2_{dmd}$ of the downstream propeller.

The first selection unit 13 receives as input the value determined by the first corrector 11 for the fuel flow rate WF, a maximum value of the first control quantity WFmax, and a minimum value of the first control quantity WFmin.

The first selection unit 13 is configured to output one of the three preceding values WF, WFmax or WFmin as a function of the operating parameters of the open rotor 1. The value outputted from the first selection unit 13 corresponds to the value of the first control quantity, WF, to be delivered to the open rotor 1.

The second corrector 12 comprises two outputs delivering a second value for the second and third control quantities $\beta_1$ and $\beta_2$. Like the first corrector 11, the second corrector 12 receives as input the values of three output variables of the open rotor 1 measured by the corresponding sensors, that is to say the speed of rotation XNP of the low-pressure compressor, the speed of rotation XN1 of the upstream propeller and the speed of rotation XN2 of the downstream propeller. The second corrector 12 also receives as input the rotation speed setpoint $XN1_{dmd}$ of the upstream propeller and the rotation speed setpoint $XN2_{dmd}$ of the downstream propeller, but not the rotation speed setpoint $XNP_{dmd}$ of the low-pressure compressor. The second corrector 12 further receives as input the value of the fuel flow rate outputted from the first selection unit 13.

The second corrector 12 is configured to determine a second value for each of the second and third control quantities $\beta_1$ and $\beta_2$ of the open rotor 1 as a function in particular of the value selected for the first control quantity, that is to say here the fuel flow rate WF.

The second selection unit 14 receives as input two pairs of values and an indicator. The first pair of values received corresponds to the pair comprising the first value of the second control quantity $\beta_1$ and the first value of the third control quantity $\beta_2$, and the second pair of values received comprises the second value of the second control quantity $\beta_1$ and the second value of the third control quantity $\beta_2$. The indicator received by the selection unit 14 corresponds to an indication delivered by the first selection unit 13 and indicating which of the three values of the first control quantity WF has been selected.

The second selection unit 14 is configured to output the pair of values of the second and third control quantities selected as a function of the indicator delivered by the first selection unit. The second selection unit 14 thus outputs either the pair of first values of second and third control quantities determined by the first corrector 11, or the pair of second values of second and third control quantities determined by the second corrector 12, the selection depending on the value of the first control quantity selected by the first selection unit 13. The values outputted from the second selection unit 14 correspond to the values of the second and third control quantities, $\beta_1$ and $\beta_2$, to be delivered to the open rotor 1.

Before being transmitted to the open rotor 1, the value of the first control quantity WF selected by the first selection unit 13 and the values of the second and third control quantities $\beta_1$ and $\beta_2$ selected by the second selection unit 14 are delivered to an integrator 15 to avoid the jolts in the command of the open rotor 1. The integrator 15 then delivers to the open rotor 1 the values of the first, second and third control quantities thus processed.

Figure 4:
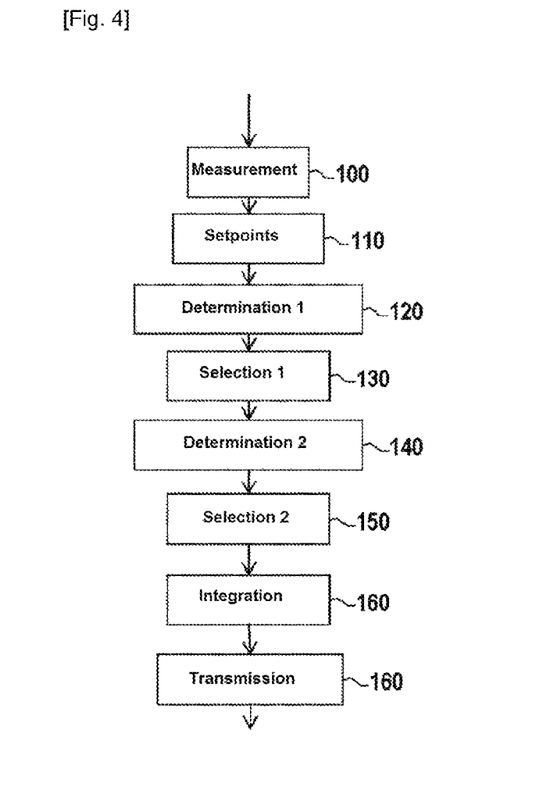
FIG. 4 represents a flowchart of a method for controlling a turbomachine according to one mode of implementation of the invention.

FIG. 4 illustrates a flowchart of a control method implemented by the control system 10.

According to the mode of implementation presented in FIG. 4, the control method comprises a first step 100 in which the values of the three variables XNP, XN1 and XN2 of the open rotor 1 are measured from different dedicated sensors and transmitted to the first corrector 11 and to the second corrector 12.

In a following step 110, setpoints are received for each of the three variables of the open rotor 1. More particularly, in this step 110, the first corrector 11 receives the rotation speed setpoint $XNP_{dmd}$ of the low-pressure compressor, the rotation speed setpoint $XN1_{dmd}$ of the upstream propeller, and the rotation speed setpoint $XN2_{dmd}$ of the downstream propeller, and the second corrector 12 receives the rotation speed setpoint $XN1_{dmd}$ of the upstream propeller and the rotation speed setpoint $XN2_{dmd}$ of the downstream propeller.

In a next step 120, first values for the three control quantities of the open rotor 1 are determined from the values of the three variables XNP, XN1 and XN2 and from the three corresponding setpoints $XNP_{dmd}$, $XN1_{dmd}$ and $XN2_{dmd}$.

In a following step 130, the value of the first control quantity to be delivered to the open rotor 1 is selected among a maximum value of the first control quantity, a minimum value of the first control quantity and the value of the first control quantity resulting from the determination in the previous step 120, the selection depending on the operating parameters of the open rotor 1.

In a following step 140, second values for the second and third control quantities of the open rotor 1 are determined from the values of the three variables XNP, XN1 and XN2, from the second and third corresponding setpoints $XN1_{dmd}$ and $XN2_{dmd}$, and from the value of the first control quantity WF selected during the first selection in the previous step 130.

In a following step 150, a choice is made of the pair of values of the second and third control quantities to be delivered to the open rotor 1 between the pair of the second and third control quantities determined in step 120 and the pair of the second and third control quantities determined in step 140, the choice of the pair of values of the second and third control quantities to be delivered depending on the value of the first control quantity to be delivered selected in step 130.

In a following step 160, each of the values selected is integrated in step 130 and in step 150, using an integrator, then in a following step 170, the integrated values of the first, second and third control quantities are transmitted to the open rotor 1.

The control method according to the invention thus allows guaranteeing in a simple and efficient manner the decoupling of the output quantities that is to say of the three variables of the turbomachine, despite the complex management of one of the control quantities such as the fuel flow rate.

The invention claimed is:

1. A method for controlling a first, a second and a third variable of a turbomachine as a function of a first, a second and a third control quantity of a turbomachine which each saturates depending on the operating parameters of the turbomachine, the control method comprising:
   a measurement of the values of the three variables of the turbomachine,
   a receipt, for each of said three variables received, of a corresponding setpoint,
   a first determination in which the first values of the three control quantities of the turbomachine are determined from the values of the three variables and said three corresponding setpoints,
   a selection of the value of the first control quantity to be delivered to the turbomachine among a maximum value of the first control quantity, a minimum value of the first control quantity and the value of the first control quantity resulting from said first determination, the first selection depending on the operating parameters of the turbomachine,
   a second determination in which second values of the second and third control quantities of the turbomachine are determined from the values of the three variables, from the second and third corresponding setpoints, and from the value of the first control quantity selected during the selection,
   a choice of the pair of values of the second and third control quantities to be delivered to the turbomachine between the pair of the second and third control quantities determined during the first determination and the pair of the second and third control quantities determined during the second determination, the choice of the pair of values of the second and third control quantities to be delivered depending on the value of the first control quantity to be delivered selected during the selection, and
   a transmission to the turbomachine of the value of the first control quantity selected and of the values of the second and third control quantities selected.

2. The control method according to claim 1, further comprising an integration of the value of the first control quantity selected and of the values of the second and third control quantities selected before their transmission to the turbomachine.

3. The control method according to claim 1, wherein the first variable corresponds to the speed of rotation of a low-pressure compressor of the turbomachine, the second variable corresponds to the speed of rotation of an upstream propeller of the turbomachine, and the third variable corresponds to the speed of rotation of a downstream propeller of the turbomachine, the first control quantity corresponds to the fuel flow rate of the turbomachine, the second control quantity corresponds to the pitch of the upstream propeller of the turbomachine and the third control quantity corresponds to the pitch of the downstream propeller of the turbomachine.

4. A system for controlling a first, a second and a third variable of a turbomachine as a function of a first, a second and a third control quantity of a turbomachine which each saturates depending on the operating parameters of the turbomachine, the control system comprising:
   receiving as input the values of the three variables of the turbomachine as well as, for each of said three variables received, a corresponding setpoint, and outputting three outputs corresponding to the three control quantities of the turbomachine,
   selecting, as a function of the operating parameters of the turbomachine, the value of the first control quantity to be delivered to the turbomachine among a maximum value of the first control quantity, a minimum value of the first control quantity and the value of the first control quantity resulting from said first determination,
   receiving as input the values of the three variables of the turbomachine as well as the setpoint of the second variable and the setpoint of the third variable and the value of the first control quantity, and outputting two outputs corresponding to the second and third control quantities of the turbomachine, and
   outputting either the pair of second and third control quantities or the pair of second and third control quantities,
   the control system outputting, to control the turbomachine, the value of the first control quantity and the values of the second and third control quantities.

5. The control system according to claim 4, further comprising receiving as input the value of the first control quantity delivered and the values of the second and third control quantities, and delivering the processed values of the first, second and third control quantities to the turbomachine.

6. The control system according to claim 4, wherein the first variable corresponds to the speed of rotation of a low-pressure compressor of the turbomachine, the second variable corresponds to the speed of rotation of an upstream propeller of the turbomachine, and the third variable corresponds to the speed of rotation of a downstream propeller of the turbomachine, the first control quantity corresponds to the fuel flow rate of the turbomachine, the second control quantity corresponds to the pitch of the upstream propeller of the turbomachine and the third control quantity corresponds to the pitch of the downstream propeller of the turbomachine.

7. An aircraft comprising at least one turbomachine and at least one control system according to claim 4 controlling at least one of said at least one turbomachine.

8. The aircraft according to claim 7, wherein at least one of said at least one turbomachine controlled by said at least one control system is a turbomachine with unducted fan.

* * * * *